Jan. 20, 1953 M. F. SASGEN 2,626,126
WINCH, HOIST, AND THE LIKE
Filed April 11, 1950 2 SHEETS—SHEET 1
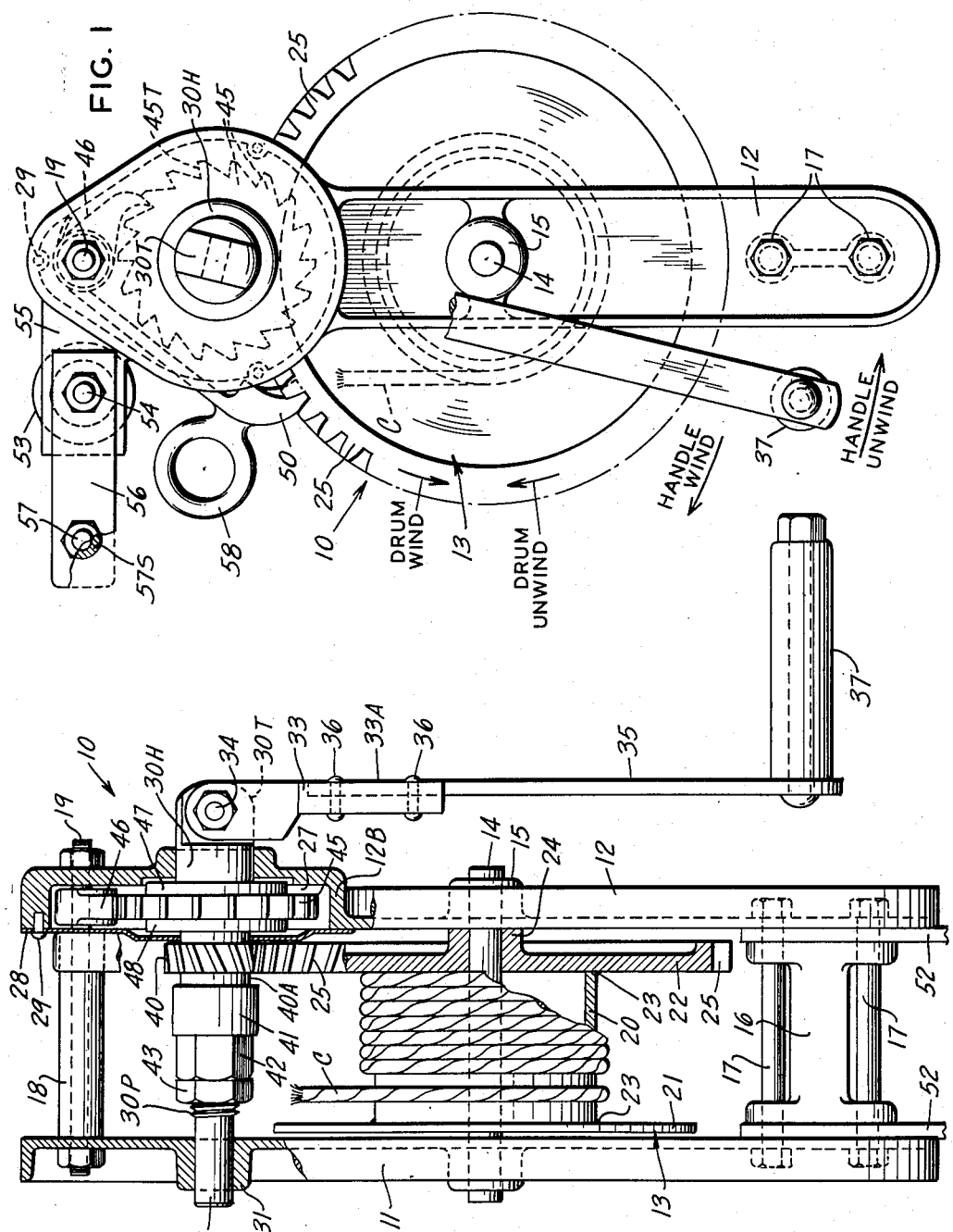
INVENTOR.
MATTHIAS F. SASGEN
BY Wallace and Cannon
ATTORNEYS Jan. 20, 1953 M. F. SASGEN 2,626,126
WINCH, HOIST, AND THE LIKE
Filed April 11, 1950 2 SHEETS—SHEET 2
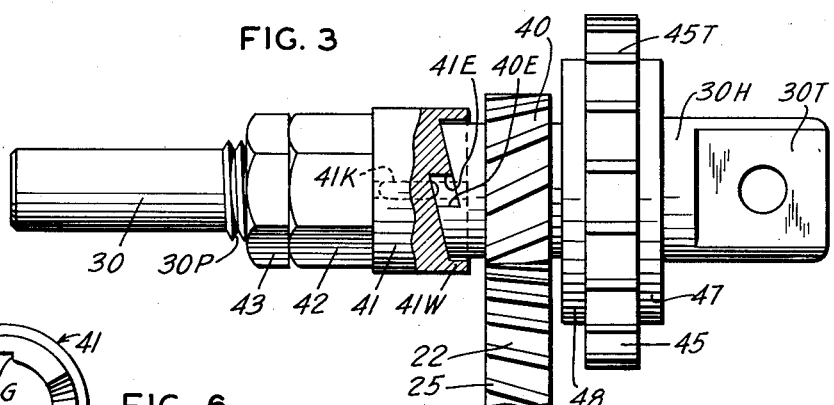
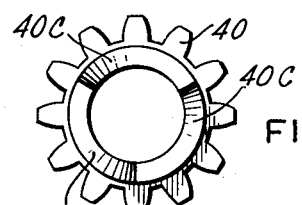
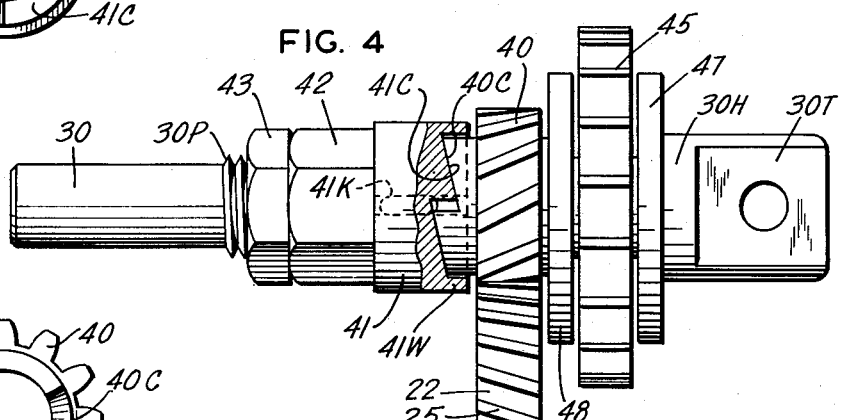
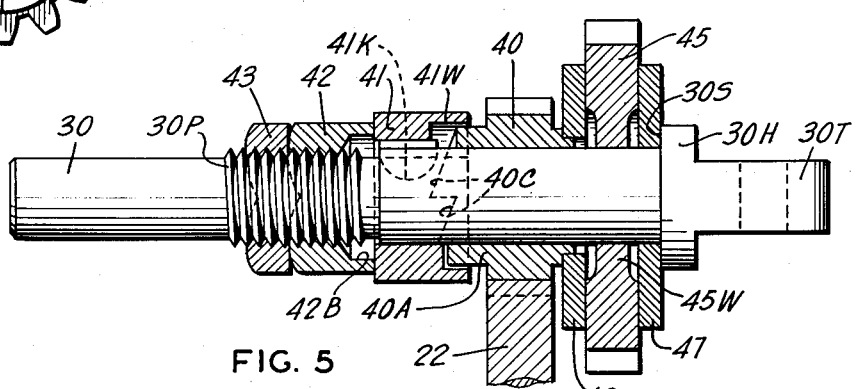
INVENTOR.
MATTHIAS F. SASGEN
BY
Wallace and Cannon
ATTORNEYS Patented Jan. 20, 1953

2,626,126

UNITED STATES PATENT OFFICE 2,626,126

WINCH, HOIST, AND THE LIKE

Matthias F. Sasgen, Chicago, Ill., assignor to Sasgen Derrick Co., Chicago, Ill., a corporation of Illinois Application April 11, 1950, Serial No. 155,297

2 Claims. (Cl. 254—187)

This invention relates to winches, hoists and like apparatus, and particularly the invention relates to such apparatus wherein the lowering of the load is controlled by an automatic braking action that requires positive actuation of the apparatus in a lowering direction.

In the patent to Jesse M. Benson, No. 2,254,989, patented September 2, 1941, there is disclosed a winch or hoisting apparatus that embodies an advantageous safety arrangement that tends to minimize the risk normally involved in hoisting of heavy loads or in raising and lowering scaffolds and the like, and in my copending application, Serial No. 745,165, filed May 1, 1947, and issued on July 17, 1951 as Patent No. 2,561,138, an improved structure is disclosed which serves to increase the safety of operation of winches, hoists and apparatus such as that illustrated in the aforesaid Benson patent.

The safety feature that is thus disclosed in the aforesaid Benson patent comprises an automatic brake that is effective in a load-lowering operation to apply braking forces to the drum in such a manner as to require actuation of the operating means such as a crank handle in a lowering direction in order to cause lowering of the load. In the use of hoists or winches of the aforesaid character in the field, it has been found that workmen place great reliance in the automatic braking action that is attained as aforesaid in the winches or hoists made under and in accordance with the Benson patent, and such reliance is in many instances such as to lead to careless manipulation of the apparatus, and in my aforesaid copending application, an improved structure is disclosed that insures that careless or unskilled operation can not adversely affect the braking function in such apparatus.

In my aforesaid copending application, as well as in the aforesaid Benson patent, the safety braking arrangements entail the use of a friction brake that is applied through the action of a screw and nut mechanism, and it has been found that in long continued use of such structures there may be objectionable wear of the braking surfaces as well as the threads of the screw and nut structure, and in my copending application, Serial No. 2,657, filed January 16, 1948, issued July 17, 1951 as Patent No. 2,561,139, there is illustrated an improved construction which enables compensation for such wear to be readily, easily and safely accomplished.

In the constructions shown in the aforesaid patent and applications, the braking mechanism may, under some circumstances, be completely released or may be released for too long a period in the use of the winch so that the load on the winch may attain appreciable downward momentum before the braking mechanism is again rendered effective, and this not only renders it difficult for the braking mechanism to stop the downward movement of the load, but it also subjects the braking mechanism to an undesirable amount of wear. It is, therefore, the primary object of the present invention to increase the sensitivity of braking control in such winches, and related objects of the invention are to reduce the wearing action on the friction clutches thereof, and to minimize the movements of the braking elements in brake-releasing and brake-applying directions.

Other and further objects of the present invention will be apparent from the following description and claims and are illustrated in the accompanying drawings which, by way of illustration, show a preferred embodiment and the principle thereof and what I now consider to be the best mode in which I have contemplated applying that principle. Other embodiments of the invention embodying the same or equivalent principle may be used and structural changes may be made as desired by those skilled in the art without departing from the present invention and the purview of the appended claims.

In the drawings:

Fig. 1 is an end elevational view of a winch embodying the features of the invention and showing the crank handle in safety position;

Fig. 2 is a side elevational view taken partially in transverse section and showing the winch with the crank handle in its normal or operating position;

Figs. 3 and 4 are fragmentary sectional views showing the parts of the brake operating mechanism in different positions;

Fig. 5 is a complete sectional view taken of the brake and brake operating structure; and Figs. 6 and 7 are end views of the opposed cam surface ends of two elements of the brake operating structure.

In the form chosen for disclosure herein, the invention is embodied in a relatively small or light winch 10 having the operating means mounted permanently on the winch frame and adapted, for example, for use in raising and lowering a scaffold or the like, and, as will hereinafter be described in detail, the winch 10 has four safety features that cooperate in attaining safe operation even in the hands of an unskilled operator. Thus, as will be evident in Figs. 1 and 2, the winch 10 has a pair of elongated and vertically disposed side frames 11 and 12 connected together in spaced relation to afford space therebetween within which a winding drum 13 is rotatably supported on a transverse drum shaft 14 that extends between and is mounted in suitable bearing bosses 15 formed on the respective side frames 11 and 12. At their lower ends the side frames 11 and 12 are connected in the desired spaced relation by a spacer bar 16 and connecting bolts 17, while at their upper ends, a spacer sleeve 18 and a connecting bolt 19 serve to hold the frames 11 and 12 in the desired relation.

The drum 13 as herein shown comprises a cylindrical barrel 20 having a plain flange 21 and a driving or gear flange 22 secured to opposite ends thereof as by welding at 23, and the flanges 21 and 22 have central hubs 24 that embrace the shaft 14 and afford the desired rotatable bearings for the drum 13. The gear flange 22 in the present instance has external gear teeth 25 formed about the periphery thereof, and the gear flange 22 is disposed so as to be adjacent to the side frame 12, which is termed the crank frame of the winch, and this crank frame 12 is arranged to support, and in part to house, the actuating and control mechanism whereby the drum movements are controlled. Thus, the side frame 12 is so formed at its upper end as to afford a chamber 27 that is disposed outwardly, or to the right in Fig. 2, from the outermost face of the gear flange 22, and this chamber is defined by a right-hand wall 12A and side flanges 12B so as to open inwardly of the winch, or to the left in Fig. 2. The open inner or left-hand face of the chamber 27, Fig. 2, is closed by a closure plate 28 that is held in position by pins 29, so that the chamber 27 affords a housing for the major elements of a safety braking mechanism, as will hereinafter be described in detail.

In affording the safety braking mechanism as well as an actuating means for winding or unwinding a cable C on the drum 13, such means are mounted permanently on the frame of the winch, rather than as a separate unit or attachment as shown in the aforesaid Benson patent, but it will be recognized that the features of the present invention may be utilized in such a separate unit or attachment. Thus, an actuating shaft 30 is extended through the two side frames 11 and 12 so as to pass through the chamber 27 somewhat above the upper edge of the gear flange 22, and the left-hand end of the shaft 30 is rotatably supported in a hub 31 formed on the side frame 11, while an enlarged cylindrical head 30H on the other end of the shaft 30 is rotatably supported within an outwardly projecting hub 32 formed on the wall 12A of the chamber 27. At its outer or right-hand end the cylindrical head 30H has a radially related tongue 30T that projects to the right and is embraced by the bifurcated end of a handle-supporting casting 33, the casting 33 being pivoted to the tongue 30T by a pivot bolt 34 so as to permit reversal of the handle from the operating position of Fig. 2 to the safety position of Fig. 1. The handle casting 33 has a radial handle portion 33A in which a radial arm 35 is secured by rivets 36, and at the end of the arm 35 a laterally projecting hand grip 37 is mounted. Thus, when the grip 37 is in the operating position shown in Fig. 2, the operator may grasp the grip and turn the handle 35 to impart rotative movements to the shaft 30, and such movements are effective to cause operation of the winding drum 13 as well as the safety braking mechanism.

In attaining such operation, the shaft 30 has a pinion 40 mounted thereon for free rotative and longitudinal sliding movement, and this pinion 40 is arranged so as to mesh with the gear teeth 25 of the gear flange 22.

For purposes that will appear hereinafter, the teeth 25 of the gear 22, and the teeth of the pinion 40, are formed as helical gear teeth. At its left-hand end, the pinion 40 has a reduced sleeve portion 40A, the end of which is formed to afford a plurality of gradually sloping cam surfaces 40C. Just to the left of the sleeve portion 40A, a cam head 41 is mounted on the shaft 30 so as to be adjustable longitudinally thereon, and a key 41K seated in the shaft 30 engages a groove 41G in the head 41 to hold the same against rotation on the shaft 30. The cam head 41 is of a diameter somewhat greater than the sleeve portion 40A, and at its right-hand end the head 41 has an annular wall 41W extended therefrom so as to loosely surround that portion of the sleeve portion 40A on which the cam surfaces 40C are formed, thereby to protect such surfaces from the entry of stones or other objectionable foreign matter. Within the wall 41W, the cam head 41 has a plurality of cam surfaces 41C formed thereon so as to be complemental and opposed to the cam surfaces 40C, and in the present instance three such cam surfaces are formed on each member so as to be disposed in endwise opposed relation. The cam surfaces each extend through 120°, and each cam surface terminates in an end surface, as 40E or 41E, that is in a radial relation with respect to the axis of the shaft 30.

To the left of the cam head 41, an adjusting nut 42 and a lock nut 43 are disposed on the shaft 30 in engagement with a threaded portion 30P so that the cam head 41 may be adjusted toward and away from the gear 40 through a limited range. Throughout such range, the nut 42 clears the key 41K by reason of a counterbore 42B formed in the right-hand end of the nut 42, while the wall 41W and the sleeve portion 40A are so related in length that throughout such adjustment the end of the wall 41W does not contact the adjacent side edges of the teeth of the pinion 40.

To the right of the pinion 40, and within the chamber 27, a safety ratchet 45 is rotatably mounted on the shaft 30. A safety pawl 46, pivoted on the bolt 19 within the chamber 27, extends to the right in Fig. 1, and is arranged to engage teeth 45T of the ratchet 45 to prevent rotation of the ratchet 45 in a counter-clockwise or unwinding direction, Fig. 1. The ratchet 45 has a central web 45W that engages a smooth or cylindrical surface of the shaft 30, and the wider flange portion of the ratchet 45 outwardly of the web 45W is arranged to afford opposite faces formed flat and parallel so as to be disposed in planes perpendicular to the axis of the shaft 30, and these annular flat faces are utilized as friction clutch surfaces. Thus, a metallic friction disc 47 is rotatably mounted on the shaft 30 between the ratchet 45 and an annular left-hand end of the head 30H. On the other or left-hand side of the ratchet 45, a metallic friction disc 48 is mounted with a press fit on an annular rabbeted portion formed on the right-hand end, Fig. 5, of the pinion 40 so that the friction disc 48 may be forced to the right or in a clamping or braking direction by endwise movement of the pinion 40. In my aforesaid application, Serial No. 2,657, issued as Patent No. 2,561,139, composition friction discs are disposed in a loose relation on the shaft 30 so that they may be clamped between the discs 47 and 48 and the confronting side faces of the ratchet to attain smooth braking action, but in the present construction, such composition discs are not shown, although they may be used if desired.

When the winch 10 is being used for supporting a load, the cable C will, of course, apply the load to the drum 13 in what may be termed an unwinding direction so as to resist winding movement of the drum, and hence this load or force acts to hold the pinion 40 against rotation in a winding direction, and the lead of the cam surfaces 40C and 41C is such that when the crank handle 35 is operated in a clockwise or winding direction, Fig. 1, the effect will be to force the cam surfaces 41C along the cam surfaces 40C so as to shift the pinion 40 to the right, Fig. 2, thereby to cause the pinion 40 to move from its released position of Fig. 4 to the clamped or braking position of Figs. 3 and 5. With this arrangement, the load will tend to produce a similar right-hand movement of the pinion 40 when the shaft 30 is held against rotation, since under such circumstances the pinion 40 will tend to move counter-clockwise, Fig. 1, so as to move its cam surfaces 40C along the then stationary cam surfaces 41C. This will clamp the friction discs 47 and 48 with respect to the ratchet 45. Thus, the operation of the handle 35 in a winding direction serves, through the cam surfaces 40C and 41C, to engage friction clutch elements that connect the shaft 30, the ratchet 45, and the pinion 40 as a unit which transmits the winding motion of the drum 13. As such winding progresses, the pawl 46 rides over the teeth 45T of the ratchet, thereby to prevent retrograde motion of the ratchet, and this, of course, serves as a safety device to prevent undesired unwinding of the drum. In addition, a safety pawl 50 is pivoted on the spacer 18 just to the left of the plate 28, Fig. 2, so as to project to the left, Fig. 1, and this pawl 50 rides over the teeth 25 of the gear flange 22 so as to hold the drum 13 against unwinding movement. It should be noted that while the safety pawl 50 is desirable, and affords an additional safety feature, it is common practice in winches of this character to rely entirely upon the ratchet 45 to hold the drum against unwinding movement, and to utilize the pawl 50 or its equivalent only in a brake or clutch releasing operation, as will hereinafter be described. It will be noted that the end of the pawl 50 conforms with the angle of the teeth 25, and the relationship is such that when a force is exerted on the pawl 50 by the gear 22 in an unwinding direction, the lateral component of such force, as such lateral component is developed by the angular tooth, forces the pawl 50 laterally against the side frame 12, thus to insure against lateral displacement of the pawl 50 from its effective position.

In the use of the winch 10, as, for example, in the raising or lowering of a scaffold, the scaffold is connected to the lower spacer bolts 17 by means including hanger bars 52. The cable C has one end connected to the drum 13 and is then extended upwardly past and to the right, Fig. 1, of a cable guide spool 53 that is journaled on a bolt 54 that is extended between arms 55 that are extended to the left, Fig. 1, from the upper ends of the respective frames 11 and 12. Additional arms 56 are secured to the arms 55 by the bolt 54 so as to project additionally to the left, and a hand grip, consisting of a bolt 57 and a sleeve 57S, is extended between the arms 56 so as to be disposed above an operating ring 58 formed adjacent to the end of the safety pawl 50. Thus, the operator may grasp or rest one hand on the hand grip 57 while using one finger or the thumb of this hand to raise or release the pawl 50 when this is required to enable the load to be lowered.

With respect to the attainment of such lowering of the load, it should be observed that the pawl 46 is housed within the chamber 27 so as to be engaged with the ratchet 45 at all times, and hence, the ratchet 45 is held against retrograde movement. Thus, in order to enable the desired lowering movement of the load to be attained, the pinion 40 must be released from the ratchet 45 in such a way as to permit controlled retrograde or lowering rotation of the pinion 40 with respect to the then stationary ratchet 45. It will be recognized that in the course of the preceding raising or lifting operation, the operation of the crank handle 35 in a winding direction has been resisted by the load through the pinion 40 so as to thereby tightly clamp the friction discs 47 and 48 between the shoulder 30S and pinion 40 and the opposed annular faces of the ratchet 45, and hence, as a preliminary to a load lowering operation, it is usually necessary to release or substantially reduce the clamping forces that have thus been set up between the various clutch elements. Thus, while the safety pawl 50 is allowed to remain in its engaged or safety position, the crank handle 35 is turned slightly in a reverse or lowering direction, thereby to cause the cam surfaces 41C to be backed away from the cam surfaces 40C, thereby to free the pinion 40. This constitutes a releasing operation of the handle 35 and serves to release the previously established clamping forces between the various friction clutch elements, thereby to free the pinion 40 from the restraining influence of the then stationary ratchet 45. When such release of the pinion 40 has thus been accomplished, the safety pawl 50 is still effective, thereby to hold the drum 13 against unwinding movement, and to initiate the desired lowering movement, the pawl 50 must be released. When this is to be done, the operator normally holds the crank handle 35 with one hand, while grasping the hand grip 57 and the pawl 50 with the other hand in the manner hereinbefore described. When the load is relatively small, the pawl 50 may be withdrawn without utilizing the crank handle to release the load or force on the pawl 50. In such an instance, when the pawl 50 is released, the shaft is held by the crank handle 35 against rotation, while the load normally becomes effective to rotate the pinion 40 slightly on the shaft 30 in a clamping direction so as to thereby cause the pinion 40 to move in a right-hand direction, Figs. 2 and 4. This effects a clamping of the friction discs and such clamping forces cause a braking action which stops the pinion 40 after but a slight rotation in a lowering or unwinding direction. In the event that the load is relatively great, it is usually necessary to turn the handle in a winding direction in order to relieve the force on the safety pawl 50, and when this is done, the parts move to the clamped relation shown in Fig. 3. This relation thus conditions the apparatus for braking operation as the load is lowered.

In such lowering operation the handle is turned in a lowering or unwinding direction, thereby to progressively tend to release the clutches that act on the ratchet 45, and as this releasing action takes place, the load acts on the pinion 40 so as to cause the same to follow the unwinding rotative movements of the handle. Hence, the friction discs are effective to control the lowering or unwinding movement of the pinion 40, and but little force is required in operating the handle. Moreover, this force must be positive in an unwinding direction, and the control or restraining forces exerted on the pinion are afforded by the friction clutch means in accordance with the load.

In prior winches and hoists made under and in accordance with the aforesaid Benson patent, the operation of the safety brake that is described in such Benson patent has in most instances been such as to afford complete safety of operation of the apparatus, but it has been found that in the hands of a careless or unskilled operator the safety brake may in effect be inadvertently disabled in the course of the release operation that has been above described. In other words, the releasing of the various clutch elements by movement of the pinion or a connected part axially of the shaft may in the prior structures be carried to such an extent as to cause the pinion or the related element to be locked to the operating shaft so firmly that the load applied to the pinion from the drum of the winch will be unable to rotate the pinion relative to the shaft and back to its clamping or braking position, and hence, the full force of the load will be transmitted to the handle so as to break the operator's grip. In my aforesaid copending application, Serial No. 745,165, means are disclosed whereby such undesired locking of the pinion to the operating shaft is positively eliminated, and such means are effective to limit the rotating movement of the pinion with respect to the operating shaft that endwise wedging movement of the pinion against the related or opposed end surface of the limiting collar on the operating shaft was prevented. In the present construction, through the use of cam surfaces 40C and 41C, the need for such a limiting means is eliminated, since the pinion 40 is positively actuated only in a brake-applying or right-hand direction. Moreover, in the present arrangement, the use of the cam surfaces 40C and 41C to actuate the gear 40 in a brake-applying direction makes it possible to afford opposed wearing surfaces of relatively large area so that these surfaces are not subjected to wear to an objectionable extent. The cam surfaces 40C and 41C are, of course, protected and housed by the cylindrical wall 41W so that falling pieces of building material can not interfere with the operation of the cam surfaces.

It will be evident, of course, that the cam surfaces 40C and 41C are effective to urge the pinion 40 in a brake applying direction when the pinion 40 is moved relative to the shaft 30 in a lowering direction, and under and in accordance with the present invention, the movement that must be imparted axially to the pinion, and the force that must be applied by the aforesaid cam surfaces, are materially reduced, and the brake is maintained partially effective at all times, and in proportion to the load that is being supported by the winch. In attaining this action, the teeth of the pinion 40 and the meshed teeth 25 of the gear 22 are formed as helical gear teeth, as hereinbefore mentioned in a general way, and these teeth slope in such a direction that when rotative forces are applied by the load to the pinion 40 in a lowering direction, one component of this force is exerted in an axial direction on the pinion 40 so as to urge the pinion 40 axially in a brake applying direction, or, in other words, in a right-hand direction as viewed in Figs. 3 to 5.

The amount of force that is to be applied to the pinion 40 in a brake applying direction is, of course, afforded in accordance with the load that is carried by the winch, and it is desirable in accordance with the present invention to control this force in such a way that while the brake will be partially effective or preloaded at all times, the preloading force applied by the helical gear teeth will be insufficient to sustain the applied load. This may be attained through the use of helical gears having the gear teeth thereof arranged at an angle of 26°, and when this is done, the preloaded condition of the braking means enables the cam surfaces 40C and 41C to quickly and easily apply the required additional forces to firmly clamp the braking elements together and fix the shaft 30 and the pinion 40 to the ratchet 45. This assures safety of operation of the braking mechanism while at the same time preserving the adjustable characteristics that are afforded in the cam means.

In the use of the winch of the present invention, the reversible handle may be located in the safety position of Fig. 1 so as to engage the frame of the winch to prevent unwinding movement thereof. In addition, the safety pawl 50 may be located in its safety position of Fig. 1, and this affords a second safety feature. The friction brake arrangement that is afforded by the cams 40C and 41C affords a third safety feature, and this cam arrangement may be readily adjusted. Finally, the preloading of the brake means serves to minimize the final controlling force that must be applied by the cams 40C and 41C, thereby to enhance the reliability of the mechanism.

Thus, while I have illustrated and described the preferred embodiment of my invention, it is to be understood that this is capable of variation and modification, and I therefore do not wish to be limited to the precise details set forth, but desire to avail myself of such changes and alterations as fall within the purview of the following claims.

I claim:

1. In a winch, a frame having side plates spaced transversely from each other, a bolt extending between upper portions of said side plates, a drum rotatably mounted in said frame between the side plates thereof and having its ends surrounded by circular flanges, one of said flanges being formed across its peripheral edge face with helical teeth and constituting a helical gear, a shaft extending through space between the side plates and rotatably mounted through portions of the side plates between the drum and the bolt, a ratchet wheel loose about said shaft, a pinion loose about said shaft at one side of said ratchet wheel and having helical teeth meshing with the helical teeth of said gear, friction discs loose about said shaft at opposite sides of said ratchet wheel, one disc being located between the ratchet wheel of said pinion, there being cam teeth at the opposite side of the pinion from the ratchet wheel, a cam head about said shaft turning therewith and shiftable along the shaft to adjusted positions and having cam teeth companion to and engaging the cam teeth of the pinion and acting thereon to shift the pinion and the ratchet wheel and the friction disc between the same along the shaft and cause tight grip upon the ratchet by the friction discs when the shaft is turned in a direction to wind cable thereon, a pawl pivoted upon said bolt and engaging teeth of said ratchet wheel to hold the ratchet wheel against turning in an unwinding direction, and a dog pivoted about said bolt and having a tooth at its free end engaging between teeth of said gear and conforming to the transverse angle of the helical teeth of the gear whereby cam action between the dog and the teeth of the gear urges the dog across the gear in the direction of the ratchet and prevents movement of the dog transversely of the gear in a direction away from the adjoining side plate and out of operative engagement with the gear, there being a stop member limiting movement of the dog toward the said side plate.

2. In a winch, a frame having side plates, a drum rotatably mounted between the side plates and having end flanges one of which is formed about its peripheral edge with helical teeth and constitutes a helical gear, a shaft extending between and rotatably carried by said side plates with one end projecting outwardly and carrying turning means, a bolt above said shaft carried by the side plates, a pinion loose about said shaft over said gear and having helical teeth meshing with the helical teeth of the gear, a ratchet wheel loose about said shaft at one side of said pinion, gripping discs about said shaft at opposite sides of said ratchet wheel with one disc located between the ratchet wheel and the pinion, a cam member carried by said shaft and acting upon said pinion to shift the pinion along the shaft and cause gripping of the ratchet wheel between the discs when the shaft is turned in one direction, and a dog pivoted about said bolt over said gear and extending downwardly therefrom and having a tooth at its lower end engaging between the helical teeth of the gear and conforming to the helical pitch thereof whereby cam action between the dog and the teeth of the gear urges the dog across the gear and prevents accidental movement of the dog along the bolt away from the adjoining side plate and out of operative engagement with the gear, there being a stop member limiting movement of the dog toward the said side plate.

MATTHIAS F. SASGEN.

REFERENCES CITED

The following references are of record in the file of this patent:

UNITED STATES PATENTS

| Number | Name | Date |
|---|---|---|
| 1,849,383 | Richardson et al. | Mar. 15, 1932 |
| 2,362,568 | Le Tourneau | Nov. 14, 1944 |
| 2,424,910 | Benson | July 29, 1947 |
| 2,561,138 | Sasgen | July 17, 1951 |
| 2,561,139 | Sasgen | July 17, 1951 |

FOREIGN PATENTS

| Number | Country | Date |
|---|---|---|
| 495,901 | Great Britain | Nov. 22, 1938 |